March 30, 1937.  S. B. ALLEN  2,075,774
VIBRATION ACTUATED CONTROLLER
Filed July 24, 1933  3 Sheets—Sheet 1

Inventor
Stratford B. Allen
by Everett S. Kent
Attorney

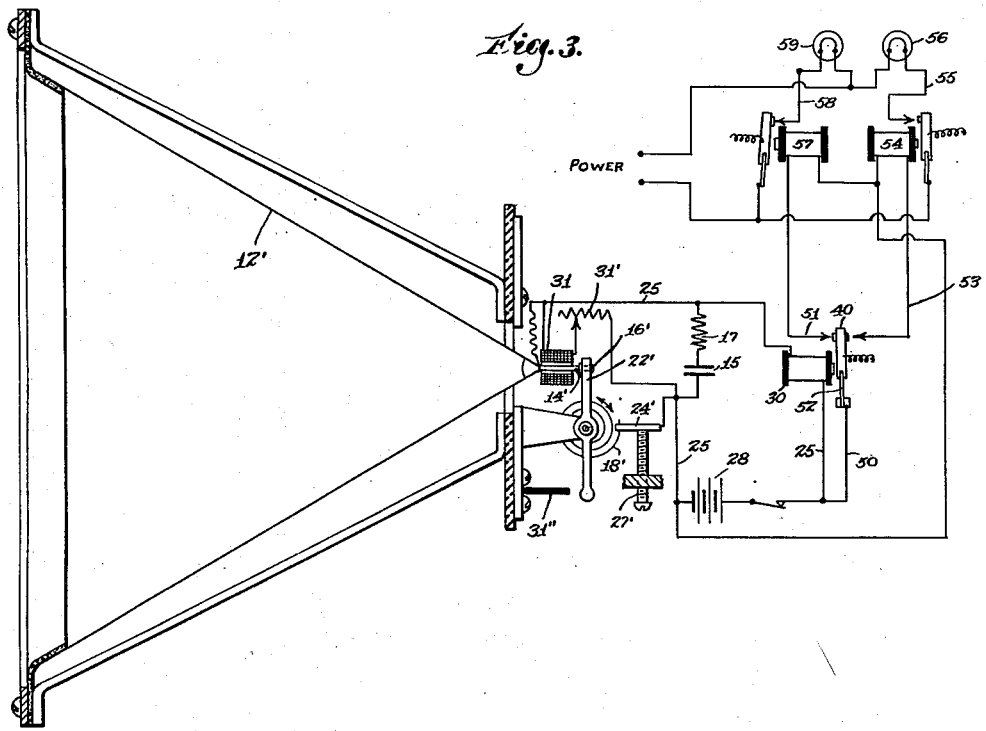
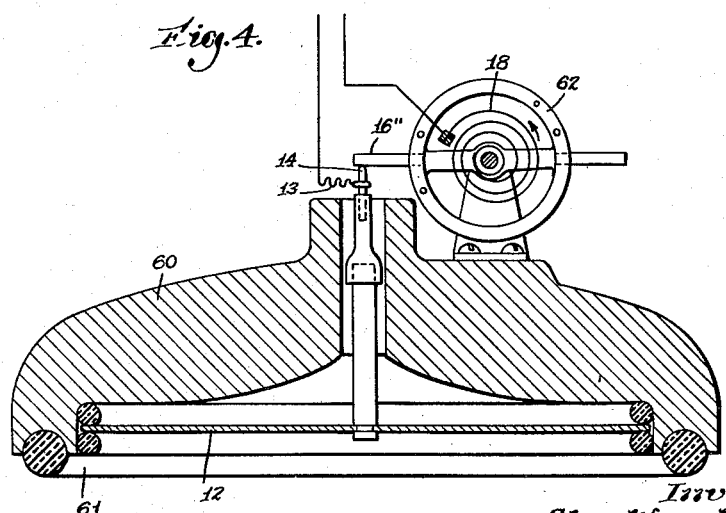

March 30, 1937. S. B. ALLEN 2,075,774
VIBRATION ACTUATED CONTROLLER
Filed July 24, 1933 3 Sheets-Sheet 3

Inventor
Stratford B. Allen
by Everett Kent
Attorney

Patented Mar. 30, 1937

2,075,774

UNITED STATES PATENT OFFICE 2,075,774

VIBRATION ACTUATED CONTROLLER

Stratford B. Allen, Arlington, Mass., assignor to Everett E. Kent, Newton, Mass.

Application July 24, 1933, Serial No. 682,037

10 Claims. (Cl. 175—320)

This invention relates to improvements in vibration-actuated controllers.

More particularly it relates to apparatus, receptive to vibrations, whose activity resulting from the vibrations received exercises an electrical control over some other apparatus to cause the movement or actuation of the latter.

Although devices to be operated more or less crudely by impact of sound vibrations have been proposed before, the present invention goes far beyond all such of which I am aware, providing sundry structural and operative advantages and new results immensely extending the field of utility, due in part to the balancing of masses in a mobile contactor whose slow oscillation is independent of gravity.

The initial activating vibrations may be of any of various sorts, whose existence the device detects and to which it responds. Among them, for example, are vibrations of sound; fluctuations or alternations of electricity or of magnetism; and tremors of earth, all of these being instances of types of vibrations that may be received directly. Vibrations of other types, as light, may actuate the apparatus indirectly by being first translated, as by being translated into sound or electricity. And so likewise a predetermined change of condition of a substance may actuate the controller, upon being suitably detected electrically, audibly, or otherwise.

The breadth of utility is illustrated by mentioning a few practical instances of widely separated character: to respond to the rumble of an approaching railroad train, received through the ground, the utility being to turn on lights; to recognize pulsations in the air; to distinguish vibration incidental to a burglarious attack upon metal or concrete, in a bank vault, and thus to operate an alarm; to perceive smoke, in or above an industrial chimney, when translated into electrical vibrations, and so to notify the fireman; to be governed by voice, translated into electrical vibrations, in a telephone system, to shift a switch, for two-way conversation; to follow the accent or envelope of amplitude of music received through the air as sound vibrations, and so to actuate a dancing figure; or if suitably tuned, to detect a speaking voice as distinguished from instrumental music, to throw a switch.

It will thus be seen that the patent is not limited to the particular field of utility by which the invention is here illustrated. The work of the controller, when activated, may be to throw a switch to establish or to break an electric current, from which any of a wide variety of consequences may result and may continue after the actuating. On the other hand, the controlled apparatus may be of a variety which works only while the said vibrations are being detected, and stops when they cease.

The vibrations are detected by an electrical make-and-break device, one of whose two contact points is on the diaphragm that receives the vibrations which are to be detected; and the other of which is on a pivotally balanced oscillating element, herein called a contactor. The latter is knocked away from contact by the vibrations of the diaphragm; but means are provided which tend to restore the contact after an oscillation whose natural period is much slower than is the period of the vibrations received. When these points are in contact together, the diaphragm being quiet, a current passes through them and through an electromagnet ("master relay") which therefore holds open a relay switch. That switch may be in the field circuit of another electromagnet ("work relay"); so that the failing of current in the master relay releases and allows that switch to be closed by its spring, and this makes a connection for actuating the work relay. The said current through the master relay may be quite weak, and therefore may flow the greater part of the time without occasioning more than the merest trifle of expense, or of attention to the battery which furnishes it.

When the receiving diaphragm becomes suitably tremulous, in response to air or other vibrations received, the resulting breaks of contact interrupt the continuity of the current through the master relay. The parts are so proportioned that, notwithstanding that this contact is repeatedly remade, the interruptions are so great that the sum of all such brief current impulses as occur during a period of vibration is insufficient to produce enough magnetic pull by the master relay to hold open the said spring switch in the winding circuit of the work relay. The interruptions at the make-and-break having thus reduced the master current sufficiently to release the spring switch, that switch establishes the current which is provided for the work relay, and that relay operates the apparatus, whatever it be, which the controller is set to control. This degree of reduction of master relay current occurs whenever the diaphragm vibrations reach some certain amplitude which is predetermined as being desired to be detected.

It will be understood that by being properly attuned to vibrations of a certain kind, frequency or amplitude, the controller may be predetermined to be unresponsive to other vibrations which may reach its diaphragm, and then will maintain a "quiet" time during which it remains ready and alert to respond to the particular vibration for which it is set.

Among other advantages are the ability to stand ready and alert with an extremely small current; the ability to operate a multiplicity of microphonic ears in a single installation, distributed for example in different regions of a bank vault but on only a single circuit, all being set in series; the ability of the acoustic element to be installed anywhere, without need for special skill, at any angle, in operating condition prearranged at factory; the ability to operate while in motion, as on an aeroplane; the ability to be tested easily at any time for readiness to operate, without actually initiating operation; and also the ability of the apparatus to restore its full readiness after an inchoate operation, in cases where the stimulus of vibrations received has not attained the minimum pre-arranged for the actuating of the control.

In attaining these and other advantageous results, it is one feature that, for the contactual relations, the invention combines, with the tremulous diaphragm, a contactor comprising a balanced rotary oscillatory element having substantial inertia, mounted on bearings having minimum friction. A weak rotary spring, or other device, which may be a solenoid, positively impels it toward the making of contact; and its natural oscillatory period is made relatively very slow, one device for which is to make it a vane; and particular arc-suppressing precaution is taken to prevent any microscopic welding upon the re-making of contacts broken by the diaphragm.

Preferably the controller as a whole operates on a principle of selective summation,—being selective in the sense that the pick-up diaphragm responds only to vibrations of the particular predetermined sort, and that its response is detected and made effective only when its vibration amounts to sufficient, in amplitude and duration, to aggregate a magnitude which has been predetermined as of critical or threshold value.

When it is receiving suitable vibrations, the diaphragm bounces the contactor in a series of rotatory oscillations whose frequency is much less than the vibratory frequency of the diaphragm. The resulting electrical contacts at each return swing are so infrequent and so brief that the magnetism of the master relay is lowered enough for its spring to operate to close the circuit of the work relay. But when diaphragm vibration diminishes to below the predetermined critical or threshold value, the points are in contact through a greater aggregate of time,—enough for the aggregate of current and therefore of magnetism in the primary or master relay to overcome its spring and so to draw its armature and thus move the switch to open position, and so to stop the magnetization of the secondary or work relay, and whatever operation is being carried on under its control.

The invention includes incidental combinations and appliances for the more perfect sensitivity, selectivity, and certainty of its operation, details of which are hereinafter set forth.

The accompanying drawings illustrate embodiments of the invention and show forms in which the controller may be made.

While the apparatus is illustrated as operating its control by a work relay using electromagnetism, because this will ordinarily be the most convenient, yet the practice of the invention is not necessarily limited to the use of electricity as the medium through which the control exercised by the master relay is realized.

It is intended that the patent shall cover, by suitable expression in the appended claims, whatever features of patentability exist in the invention disclosed.

In the drawings:

Figure 1 may be considered an elevation, on a greatly enlarged scale, of the part of the apparatus containing the vibration-receiving diaphragm and the contactor which controls the master relay, the contactor in this instance being of the spring-moved vane type, and the section being taken on the irregular line 1—1 of Figure 2 in order best to show the working parts;

Figure 2 may be considered as a plan of the same, in section on the irregular line 2—2 of Figure 1, which is located so as best to show the working parts;

Figure 3 may be considered an elevation or plan of similar apparatus but having a cone type of diaphragm and a solenoid coacting with the spring for moving the contactor, and having a more extended diagrammatic indication of uses to which the appliance may be put;

Figure 4 is an elevation of apparatus of the type of Figure 1 arranged as a geophone to receive earth vibrations and having a spring balance wheel contactor;

Figure 6:
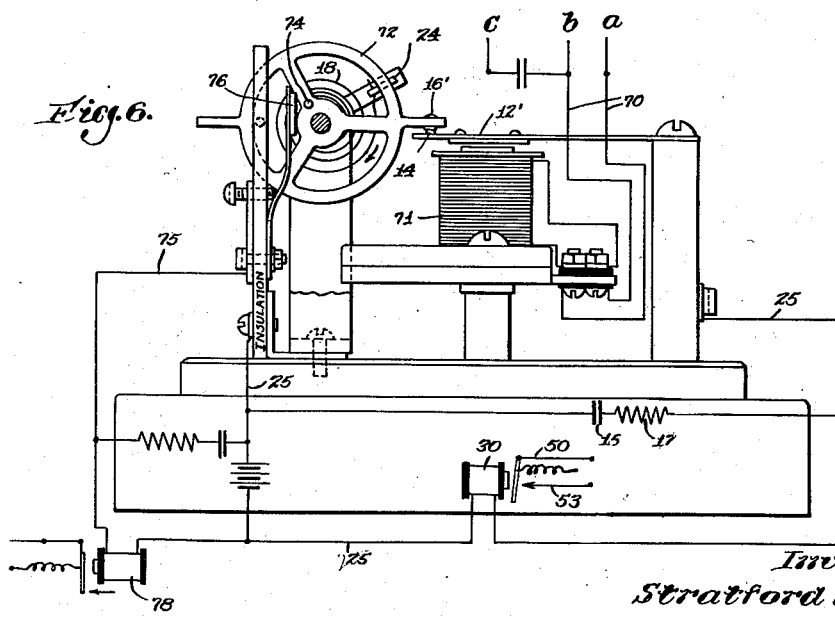

Figure 6 an elevation, with fuller showing in diagram of outside connections, of apparatus embodying the invention as arranged for actuation by electrical vibrations.

Figure 1:
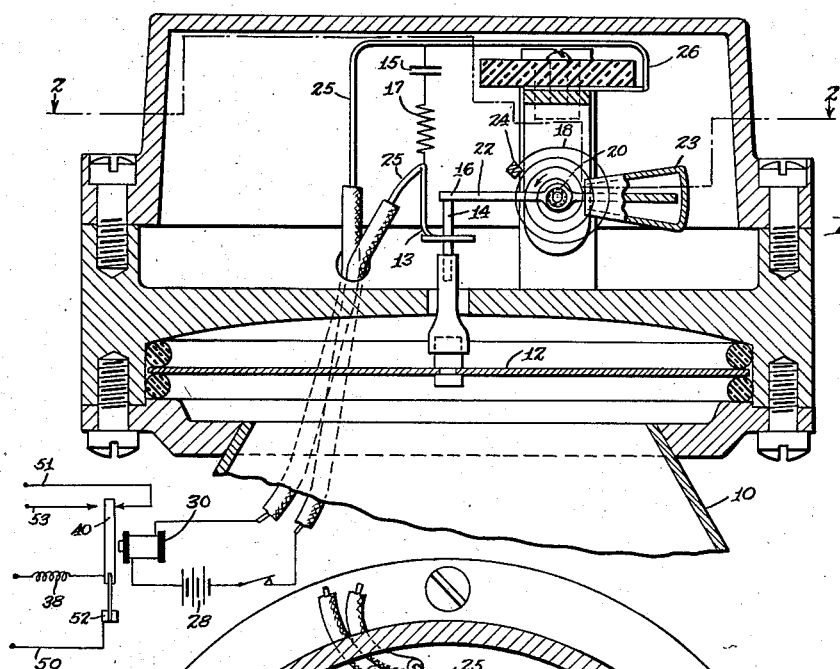

10, in Figure 1, indicates a sound receiving and condensing device, such as a horn, which may be used when the apparatus is desired to be especially sensitive to sound in some particular direction. The diaphragm 12 for receiving the vibrations is held at its margin, and it carries at its center a post 14 whose tip serves as an electrical contact point in the magnet circuit 25 of the master relay 30. This point therefore vibrates in harmony with the sound vibrations which impinge upon the horn 10 and diaphragm 12. The cooperating electrical contact point 16 is on a damped slowly oscillating contactor here represented as a heavy vane 22 which may be of silver and whose axle may have a suitable low friction bearing, such as a jewel bearing 20. Preferably the masses of this contactor are balanced about its axis so that it is independent of gravity and will operate equally at whatever angle its axis may be set or tipped. A hair spring 18 anchored at 24 on a fixed part of the apparatus impels the contactor and its contact 16 against the contact 14, but lets it be driven away by any blow delivered on 16 by vibration of the diaphragm contact point 14.

The jewelled bearings are preferably insulated so that no current passes through them. The electric circuit 25, reaching the contact 14 through a pig tail 13 proceeds thence through contact 16, contactor 22, hair spring 18 and its anchorage 24 to a conductor 26, and so to a further portion of the said circuit 25, and through battery 28 and the magnet windings of the master or primary relay 30, and to the contact 14. Across the gap which exists when these contacts 14 and 16 are separated, are shunted a condenser 15 and resistance 17 for perfecting the operation of the make and break as hereinafter explained.

The circuit 25 and its relay 30 operate to control a circuit 50 whose more powerful current can actuate or control whatever it is the purpose of the apparatus to actuate or control. For illustration, the circuit 50 may lead to a switch base 52, whence it goes out through switch 40 and either of two switch points 51 or 53. In the exterior circuits served by one of these points 51 or 53 may be the apparatus, for example, an electromagnet as above mentioned which constitutes a secondary or work relay. A fuller illustration of such an outside circuit, controlling other circuits, is seen in Figure 3.

The actual control of such an exterior or second current, for example through point 53 depends upon the position of a switch 40 which a spring 38 urges closed, and which the master relay 30 urges open, this switch being carried on the armature of the relay, with a magnetic pull whose strength depends upon the current through the diaphragm-contactor contacts 14, 16. This, in turn, is controlled by the length of time during which the contactor contact 16 is actually touching the diaphragm contact 14.

Figure 2:
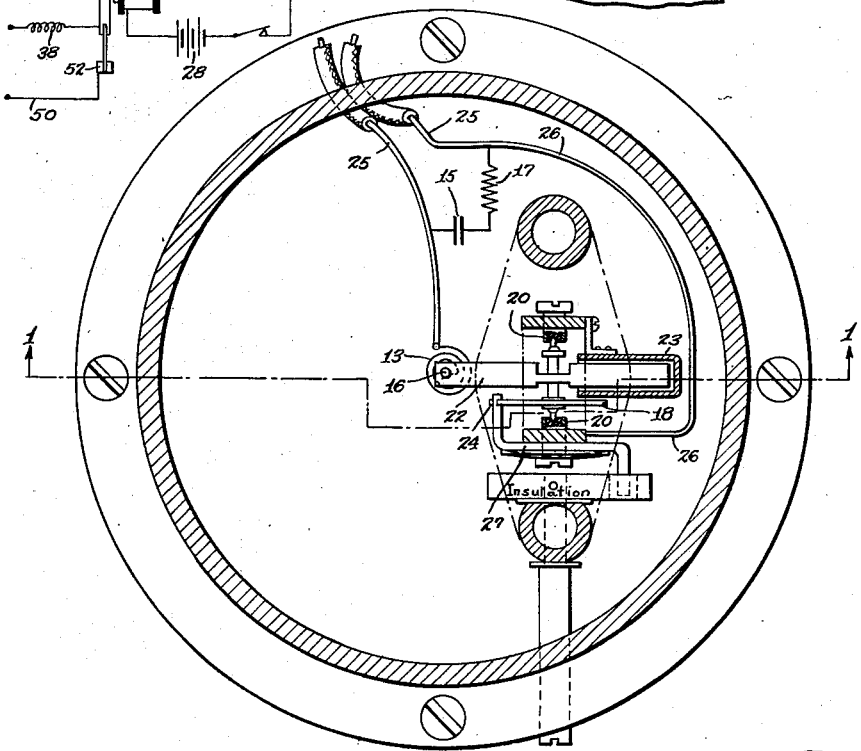
Figure 5:
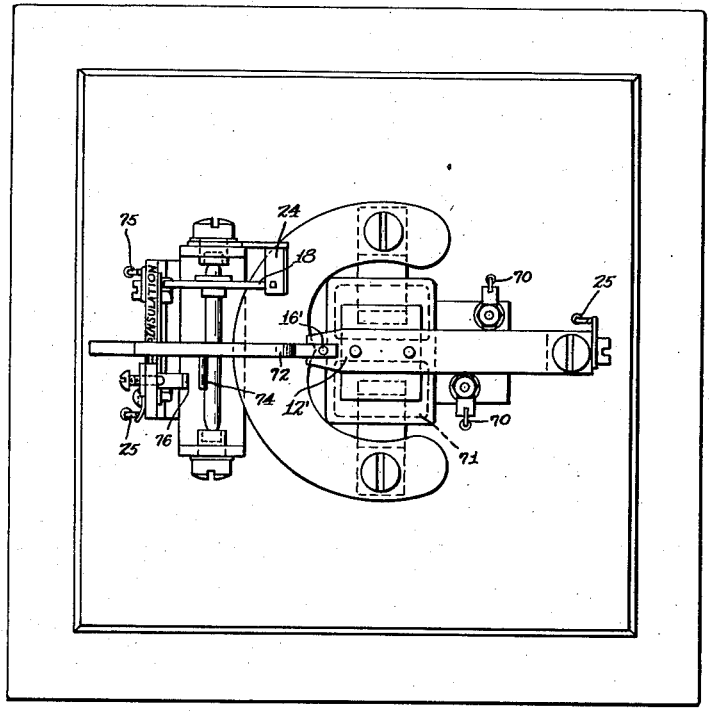
Figure 5 is a plan.

And, while the contactor may be a mere bar, or a wheel resembling a balance wheel of a watch, Figs. 4, 5, 6, the drawings illustrate how its vibratory period may be further slowed by shaping it with vanes, as seen in Fig. 2, which vanes may be enclosed in a box 23 with small clearance from the walls of the box, further to damp its movement, on the principle of a dash pot. However this element may also be operated in open air.

The contact point 14 receiving sound vibrations may be vibrating some hundreds or thousands of times per second; and yet by suitable design and adjustment, the frequency of its contact with the point 16 may be of the slow order of one or two or thereabouts per second. Therefore the receipt of vibrations to which the diaphragm 12 is suitably tuned to respond reduces current in the relay 30 enough to release the armature switch 40. Owing to the balanced mounting of the masses in contactor 22, the apparatus will operate in any position; one important practical result of which is that the apparatus can be put into use anywhere in the field without the attendance of a skilled engineer being required for its proper setting. It can be shipped from factory ready for use, and set anywhere, by anyone.

Further important features relate to sensitivity, and to durability of sensitivity.

For some uses a high degree of sensitivity is desirable; and always it is useful to provide apparatus which can durably maintain its initial condition of sensitivity and efficiency. Important parts of the invention contributing to this are found in the measures taken structurally to prevent the occurrence of microscopic electric arcs, particularly between the points 14, 16, where the vibration of the diaphragm and of the balanced contactor make contacts, and particularly at the bearing of the latter. It is for this reason that the bearings are made insulated and the course of the delicate master current is directed through the spring. In prior studies it has been proposed that a certain pressure of the reacting element against the diaphragm must be attained in order to exceed the critical pressure of conductivity, so that a current will flow. No such limitation appears to affect the present apparatus, when constructed as herein set forth; but I have found that difficulties in former apparatus seem to have been due to the failure to prevent the minute electric arcs which can form and which, under the conditions of extremely close contact where vibrations are so small, can have the effect of making the parts stick together by microscopic welding. The elimination of these arcs removes this difficulty, and thus removes the need for having a kick by the diaphragm large enough to overcome the supposedly needed pressure for attaining a state of conductivity. In consequence, it is found that sufficient conductivity is had without there being discernible any such minimum requisite of pressure. Contributing to this end of avoiding the microscopic sparking I combine with each pair of contacts a resistance and condenser, constituting an arc-suppressor.

The combination and purpose of this arc-suppressor is not the usual purpose, to prevent erosion of the metals by arc, but the function is to produce a deepened ability of the device for response to extremely weak signals received by the vibrating diaphragm, comparable in sensitivity to that of the human ear in response to actual energy received. By this means, the device of the invention, without amplification, can perform work and produce results for which vacuum tube amplifiers normally would be used in sensitive relay circuits. In order to produce high sensitivity, the resistance should bear such a relation to the capacitance as practically to prevent the formation of any arc at all upon the remaking of contacts. A further distinction over the practice where the aim is to prevent erosion is that there the purpose is to preserve the surfaces for good contact, but here the purpose and effect are to avoid adhesion and to maintain the contacting surfaces individually separated from each other. In the anti-erosion practice a slight sticking of the surfaces together due to the arc-welding is immaterial, and is neglected because there is always sufficient power present to break the contact physically at the proper time. But I have discovered that it is possible to make vibration actuated apparatus sensitive by elimination of the condenser-welding on the making of contact, in which case an adequate contact for electrical conductivity can be made by an extremely weak pressure of the spring 18; and the point requiring critical attention is the readiness of the two surfaces to become separated, by effect of the inertia of the contactor when the diaphragm is vibrating only feebly.

When thus constructed the sensitivity of the device, for detecting the impingement of any vibrations to which the diaphragm is tuned, can be easily adjusted by varying the setting of the hair spring 18, whose anchorage 24 is a projection from a lever 27 that is frictionally held by a spring washer concentric with the axis of the spring 18. This lever and anchorage can be turned about that axis to any selected position for regulating the pressure with which spring 18 urges the one contact point against the other. The conductor 26 leads to a conducting support on which these parts are mounted.

Applications of the invention to other uses are shown in the drawings. Figure 4 represents it arranged as a geophone. A heavy body of dense metal, as cast iron or lead 60, having a plane face with a rubber ring projecting for contact with the earth as at 61, has a diaphragm 12, which vibrates in response to pulsations received through the earth, as from a railroad train, and thus vibrates its central post which has the pig-tail connection 13 and carries the contact point 14. The opportunity is improved, in this figure, to illustrate the contactor 62 in circular form, as a wheel. This may have a little silver wire 16" for its contact point, and it is balanced about an axle which turns on jewelled bearings, like the vane 22.

Figures 5 and 6 represent the apparatus as it may be set to respond to diaphragm vibrations received electrically. The vibrator is the tongue 12'. This corresponds to the vibrator diaphragm 12 of Figure 1, as to combination and reaction with the contactor 72, although it receives its vibrations as the armature of an electromagnet 71. When pulsations of an oscillatory or broken current, whether of voice, dot and dash, or other,—(and whether from a direct wire circuit, as a—b, or a condenser circuit as a—c)—come over the input circuit 70, the vibrator 12' kicks the contactor contact 16' away and weakens the relay magnet 30 as above described.

These figures also represent an additional feature, in the pin 74 carried on a spoke of the balance wheel, in position to make a contact with a spring 76 in another circuit 75 when the sound level being represented by the vibrations of the tongue 12' is so high, or those vibrations are otherwise so violent, that the balanced contactor is kicked off far enough for the pin 74 to make this contact 76, in which case a current may pass through apparatus typified at 78 for sounding a signal, moving a switch or doing any other thing useful under these circumstances.

Figure 3 shows an embodiment in which the contactor is drawn toward contact, after each break, by magnetic force, and may be aided by the hair spring 18', in the manner previously described for the similar spring 18 or may be opposed by that spring. As the spring may be set either way its arrow is made double headed, pointing in both directions; but the feature now to be described relates more particularly to that setting of the spring in which that spring tends to move the balance vane contactor away from contact of the points 14', 16', thus putting the vane into a state of dynamic or kinetic balance rather than of what may be called static balance, when at rest, as in the forms of the invention above described. In Figure 3 the cone 12' for receiving vibrations may be considered as a well known form of diaphragm; and this has a central post which vibrates with it and carries the contact point 14'. The vane 22' is of iron and has a bit of silver 16' set into it to constitute the co-operating contact; and there is a hair spring 18' connected to the vane and anchored as at 24' on the adjustable mounting 27', by suitable setting of which the spring 18' may be made to urge the contactor vane either gently toward contact 14' as above described or gently from it, thus tending to break the contact, as will now be described. The post carrying the contact 14' is surrounded by a solenoid 31, of many turns and having no core (or if preferred having a tubular core of iron), having an extremely high resistance in proportion to the external load resistance. This stands continuously shunted across the part of the circuit 25 which goes through the contacts 14', 16'.

When the points 14' and 16' are in contact together, nearly all of the master current flows directly through them as being a path of much less resistance; but that portion which goes through the solenoid 31, although slight, may be enough to draw the iron vane so as to hold the contacts 14', 16' together. The proportion thus passing may be adjusted by the variable resistance 31', or by adding resistance to the line through the contact. When vibrating, the cone 12' and point 14' drive away the point 16' and vane 72, breaking the circuit at that point and producing the above described effect of weakening the magnetic power of the relay 30; but current continues to flow through the solenoid 31, and becomes larger because the short-circuit through points 14', 16' is removed. The current through the contact is large enough to operate the external load (master relay); and when those contacts are separated the current passing through the relay is smaller because of the greater resistance of the solenoid, and in fact it is not enough to hold the relay armature, but it may be strong enough to attract the iron vane 22' and to draw it back to a fresh contact of the points 14', 16'. The parts should be designed and adjusted so that the enlarged solenoid attraction is strong enough to draw the iron vane back, to remake the contact 14', 16', notwithstanding mild opposition of the spring 18', if such be adjusted to react negatively, as assumed. It will be noted that, in this arrangement, at the instant of each breaking of the contact 14', 16' the spring 18' can co-act with the diaphragm in moving the vane away from the contact, and thus the amplitude of swing away may be greater than where the spring was initially opposing a break, (as in Figure 1). This is particularly useful when the diaphragm vibrations are feeble; and it is a feature making the apparatus more sensitive. With any considerable amplitude of repulsion from contact position the spring 18' will have passed its neutral point (position of zero tension) and will therefore start the vane swinging back toward a remaking of the contact. The sensitivity of this device can be controlled by the variable resistance 31'; and this may be placed at a distance if desired, at some place where it is more convenient to exercise this variation.

The combination of spring force and electromagnetic return force applied to the vane returns the contact to the same degree of sensitivity each time,—an effect which is not obtainable by ordinary microphonic contacts wherein the conductivity is purely a matter of chance, shape and position of the contacting surfaces.

If the spring is used as illustrated in Figure 3 and as above described, it is an auxiliary control which may urge movement in the direction to break contact. It then functions to reduce the pressure between the contacts, thus decreasing the current passing through them and increasing the current in the solenoid. The result is a state of equilibrium between kinetic forces, with the intensity of pressure at the points of contact and while they are in contact seeking a point of rest between the magnetic pull and the vane's springy resisting of that pull; in other words, with the vane at the contact point vibrating at a high frequency even though through an infinitely small amplitude. When a superior external force arrives, through diaphragm vibrations, the contact frequency is disturbed or modulated. The apparatus is more sensitive in this dynamic equilibrium than in such a static equilibrium as occurs when the apparatus is only spring controlled and the vane 22 is at rest against a quiet diaphragm 12.

But in suitable cases, the spring alone, or the solenoid alone may be used. A stop 31" may be provided to prevent the vane from swinging beyond influence of the magnetic power of the solenoid 31.

A further useful characteristic may be imparted to the device if one of the contacts 14, 16, or 14', 16', be made of carbon, a substance whose tendency is less than that of metals toward production of sticking contacts, making it possible thus to avoid the introduction of an arc-suppressor, where such may be undesirable.

In each case the device of the invention is free from having the defects of a pendulum system, because its masses and forces are free from being affected by gravity, can be given such oscillatory frequencies as may be desirable, can be used on an irregularly moving support, and can be set at whatever angle the user may choose to place it.

The structure which makes for extreme sensitivity is that which avoids the sticking of diaphragm and contactor together by avoiding the arising of microscopic arc welding upon remaking of contact. This is prevented at the bearings by insulating them so that no current passes therethrough and by providing for passage of the current through the spring and its anchorage, and further by providing the suppressor circuit, in that place at least, where contacts are remade during the vibratory make-and-break.

The uses of the disclosed device are many and various, and the diagrams in Figures 1, 3 and 6 are introduced to suggest some of these possibilities. The use may be as a sound level indicator, the intensity of sound being determined relatively by the duration of breaks at the contact point. This may be accomplished practically by observing the apparent increase of resistance, or decrease of current, in the circuit 25, as the device responds to the summation of brief contacts at 14, 16, when it is being vibrated under the effect of vibrations received from external sources and detected by the instrument. For this purpose any suitable electrical measuring instrument of well known type may be used. For indicating that a certain maximum amplitude of vibration is being received, the contact 76, 74, of Figure 6, with its separate circuit 75, 78, may be employed.

In Figure 1 the circuit which includes line 50 and contact 51 may be a pilot circuit to show that the instrument is in working condition, alert and ready, as by operating a small light; or it may be a working circuit of some kind; or it may be omitted.

In Figure 3 the suggestion for connection to external uses is amplified by showing the work circuit 53 as going through a relay which can operate a switch in a power circuit 55 having a load 56 of any sort, here typified by a lamp; while the circuit through 50, 51 goes through another relay 57, controlling another work circuit 58 in which the load is indicated by another lamp 59. In my co-pending application upon an improvement in actuated figures, Serial 543,561, about to be issued as Patent No. 1,919,188, the control circuit corresponding to 50, 53, contains a make and break vibratory feature which keeps the figure dancing continuously while the sound of music is loud enough, or ticks it with the measure when the accent of the music is favorable to this. The device 71 of Figure 6 which receives electrical oscillations in the apparatus of the invention may be in an inductive circuit (not here shown) which reflects the changes in an alternating current circuit through a photo cell, upon which is focused a light shining through a lens and through the space where the presence of smoke is to be detected. With the increase of smoke the light reaching the cell diminishes, the resistance of the cell increases and the current through it diminishes, and these changes of the alternating current may be observed in a coupled capacitance circuit which may have a telephone for listening to the hum, or may have the electromagnet 71 which will leave the master relay 30 released so long as the vibrations in 71 continue with sufficient amplitude to equal a predetermined standard, indicating that the smoke is not more dense than the predetermined limit, the change of light being thus translated into a change of electrical vibration and thence by electromagnetism into kinetic vibrations of the tongue 12'. Or, the change of hum in a telephone in said circuit might be detected by the apparatus of Figures 1, 3 or 4, with automatic control of warning or recording apparatus when the predetermined level is attained or fails to be attained. The apparatus can thus be used for all purposes for which apparatus operating by interruption of light can be used, as for counting articles, controlling mechanism, and starting and stopping machinery, without the need of thermionic amplifying tubes and incidental arrangements heretofore proposed, but controlling a relay force as powerful as may be desired. The considerable arc through which the anchorage of the spring 18 may be adjusted affords opportunity for wide variations in the sensitiveness to which the apparatus may be adjusted.

In the operation of this device as an acoustic relay, or for detection and relay of other relatively weak vibrations, the construction of the contactor, so that its masses are balanced about an axis of rotation, introduces the principle that the pressure against the diaphragm contact point 14 is independent of the mass of the contactor, and is independent of the direction or value of gravity, but can be made extremely delicate because it can be provided from an external source, one such being illustrated in the spring 18 and another such being illustrated in the solenoid 31; and it being possible to combine these two in order to obtain a desired composite effect, by their working together, or by their working oppositely in direction.

With this the construction disclosed combines the principle of damping, which imposes upon the contactor an extension of its natural period of holding the circuit open. This contributes to successful operation for detecting a predetermined amplitude of sound or other vibration in two ways: for small vibrations the vane prevents the contact from swinging wide when opening and thus minimizes the response of small sounds; and, in the opposite case of loud sounds, the violence of diaphragm vibration throws the vane through greater travel which, because of the vane, is performed more slowly. Thus the instrument tends to respond to the loud and to ignore the weak sounds, below or different from those which it is desired to detect, whereas a more freely moving element, swinging, for example, as a pendulum, would give more equal response to all.

It is to be noted also that the make-and-break which it is preferred to use is that of a single-contact device, as contrasted with the contacts in a microphone or telephone transmitter where a multitude of granules are packed more or less tightly together and not always in the same condition when in a state of rest. Because of the construction described the device may have sensitivity of response to small external vibrations comparable to the sensitivity of a microphone, if not in fact exceeding it, although, unlike the microphone, it is not in itself a faithful reproducer of audible sounds received nor of articulate speech, because it operates by make-and-break, rather than by variation of resistance and of passing current,—although it has been observed that under certain conditions of operating at very low intensity or extremely tight adjustment of the hair spring against the diaphragm even this may be possible.

As even the slightest vibration kicks the contactor away, and completely breaks the current until the contactor returns, the apparatus has possibility of sensitiveness exceeding that of granular microphone where the distinctions are caused merely by changes of resistance and the current is continuous.

Although the control exercised by the apparatus of the invention is illustrated as being exercised by means of a relay, through which the changes in current are given effect, it is obvious that the invention is not restricted to this particular way of utilizing the changes of current for which the invention provides, which governs the exercising of the desired control. Thus, as showing other ways for illustrating the breadth of utility in this respect it is clear that in place of the relay the current passing through the contact might be used to change the bias of the grid in a vacuum tube; or might be connected so as to upset the resistance of a balanced circuit,— in order, by either of these means, to operate a control or indicator.

I claim as my invention:

1. An electric controller, comprising a vibratory diaphragm adapted to receive vibrations and having a contact on itself in a circuit, a contactor pivotally mounted and contacting with the diaphragm contact to make and break that circuit, the diaphragm and contactor having different vibration frequencies, said contactor being pivoted at its center of mass so as to be free of gravity effects, means biasing said contactor with respect to the diaphragm, and means in said circuit, responsive to variations in current flow and energized by the current through said contact and contactor.

2. A controller as in claim 1, the said means for normally biasing said contactor with respect to the diaphragm comprising the combination of a spring and means exerting a magnetic force, both of which are applied to the contactor.

3. A controller as in claim 1, the said means for normally biasing said contactor with respect to the diaphragm comprising the combination of a spring and means exerting a magnetic force, both of which are applied to the contactor; and means for adjusting the magnetic force of this said combination.

4. A controller as in claim 1 in which the means biasing the contactor with respect to the diaphragm is a hair spring, coiled around the pivotal axis, with one end attached to the contactor and with one end anchored, and means to adjust the position of the anchored end angularly with respect to said axis.

5. A controller as in claim 1, in which there is a solenoid providing means tending to restore the contactor to contact with the diaphragm contact, this solenoid being shunted across said contact and the contactor and thereby becoming a part of said electrical circuit, and providing magnetic force, the said contactor being an armature to the solenoid.

6. A controller as in claim 1, in which there is also combined means for damping the movement of the contactor.

7. A controller as in claim 1, in which the biasing means is a hair spring coiled about the pivotal axis of the contactor and connected as a part of said circuit, and the pivot bearings of the pivotally mounted contactor are insulators.

8. A controller as in claim 1, in which the electromagnet in said circuit is a part of a master relay whose armature is drawn by a magnetic flux corresponding to the summation of current which flows when the diaphragm is quiet and the contactor is approximately continuously on said contact, and is to be released when the summation of magnetic flux is reduced by the discontinuity of contact attendant upon vibration of the diaphragm.

9. A controller as in claim 1, in which there is a solenoid providing means tending to restore the contactor to contact with the diaphragm contact, this solenoid being shunted across said contact and the contactor and thereby becoming a part of said electrical circuit, and providing electromagnetic force tending to restore the contactor to contact with the diaphragm contact, the said contactor being an armature to the solenoid; there being also a spring applied to the contactor, coacting with the solenoid upon the contactor, applying force tending to move it with respect to the position of said contact.

10. A controller as in claim 1, in which there is a solenoid providing means tending to restore the contactor to contact with the diaphragm, this solenoid being shunted across said contact and the contactor and thereby becoming a part of said electrical circuit, and providing electromagnetic force tending to restore the contactor to contact with the diaphragm contact, the said contactor being an armature to the solenoid; there being also a spring applied to the contactor, coacting with the solenoid but in opposite direction, whereby the contactor has a status of dynamic balance, as between solenoid and spring, when the diaphragm is inactive.

STRATFORD B. ALLEN.